United States Patent [19]

Tervo

[11] Patent Number: 4,995,414
[45] Date of Patent: Feb. 26, 1991

[54] BUTTERFLY VALVE METHOD AND APPARATUS

[75] Inventor: John N. Tervo, Scottsdale, Ariz.

[73] Assignee: Allied-Signal Inc., Morris Township, Morris County, N.J.

[21] Appl. No.: 534,052

[22] Filed: Jun. 6, 1990

[51] Int. Cl.⁵ .............................................. F16K 1/22
[52] U.S. Cl. ............................ 137/1; 251/175; 251/215; 251/228; 251/248; 251/283; 251/308
[58] Field of Search .................... 137/1; 251/160, 215, 251/228, 283, 308; 248, 173, 175

[56] References Cited

U.S. PATENT DOCUMENTS

| | | |
|---|---|---|
| 212,556 | 2/1879 | Johnson . |
| 443,326 | 12/1890 | Leverich . |
| 965,322 | 7/1910 | Peterson . |
| 1,167,145 | 1/1916 | Baverey . |
| 1,328,565 | 1/1920 | Howard . |
| 1,541,047 | 6/1925 | Hart . |
| 1,744,798 | 1/1930 | Price . |
| 2,051,881 | 8/1936 | Mock . |
| 2,095,263 | 10/1937 | Moss . |
| 2,271,390 | 1/1942 | Dodson . |
| 2,796,082 | 6/1957 | Green et al. . |
| 2,833,511 | 5/1958 | Fletcher . |
| 2,910,266 | 10/1959 | Condello et al. . |
| 3,008,685 | 11/1961 | Rudden . |
| 3,062,232 | 11/1962 | McGay . |
| 3,065,950 | 11/1962 | Goldberg . |
| 3,200,838 | 8/1965 | Sheaffer . |
| 3,298,659 | 1/1967 | Cupedo . |
| 3,344,808 | 10/1967 | Cary . |
| 3,400,907 | 9/1968 | Horn et al. . |
| 3,442,489 | 5/1969 | Cary et al. . |
| 3,516,640 | 6/1970 | Bryer et al. . |
| 3,545,486 | 12/1970 | Larson . |
| 3,675,681 | 7/1972 | Obermaier . |
| 3,677,297 | 7/1972 | Walton . |
| 3,794,288 | 2/1974 | Dolder et al. . |
| 3,837,616 | 9/1974 | Scanderberg ............... 251/175 X |
| 3,960,177 | 6/1976 | Baumann . |
| 3,971,414 | 7/1976 | Illing . |
| 3,982,725 | 9/1976 | Clark . |
| 3,993,096 | 11/1976 | Wilson . |
| 4,084,617 | 4/1978 | Happe . |
| 4,190,074 | 2/1980 | Mailliet et al. . |
| 4,313,592 | 2/1981 | Baas . |
| 4,367,861 | 1/1983 | Bray et al. . |
| 4,508,132 | 4/1985 | Mayfield, Jr. et al. . |
| 4,534,538 | 8/1985 | Buckley et al. . |
| 4,556,192 | 12/1985 | Ramisch . |
| 4,586,693 | 5/1986 | Tinner . |
| 4,706,706 | 11/1987 | Page et al. . |
| 4,712,768 | 12/1987 | Herr et al. . |

FOREIGN PATENT DOCUMENTS

| | | |
|---|---|---|
| 2821766 | 11/1979 | Fed. Rep. of Germany . |
| 7527822 | 9/1975 | France . |
| 1533073 | 11/1978 | United Kingdom . |
| 2131867A | 12/1982 | United Kingdom . |

OTHER PUBLICATIONS

"Fishtail vs. Conventional Discs in Butterfly Valves", Carl D. Wilson, Instruments & Control Systems, vol. 41, Mar. 1968.
"The Note On The Reduction Of The Fluid Dynamic Torque Of Butterfly Valves", D. W. Bryer/D. E. Walshe, National Physical Laboratory, Sep. 1986.

Primary Examiner—Robert G. Nilson
Attorney, Agent, or Firm—Joseph R. Black; James W. McFarland; Robert A. Walsh

[57] ABSTRACT

A method for opening a sealingly closed, balanced-torque butterfly valve, and apparatus adapted for use with the method. The butterfly valve (40) comprises a valve plate (42) having a peripherally disposed seal (162) seated in an annular recess (160). A flow passage (164, 166) is formed in the valve plate (42) and fluidically connects the recess (160) to the downstream-facing surface of the valve plate. A check valve (168) is disposed in the flow passage (164, 166) to alternately block or permit flow therethrough. Outwardly directed pressure exerted by high-pressure fluid on the seal (162) is relieved by opening the check valve (168) in reponse to a slight translational movement of the valve plate (42) relative to a rotatable shaft (72) which pivotally connects the valve plate to the duct (146).

4 Claims, 6 Drawing Sheets

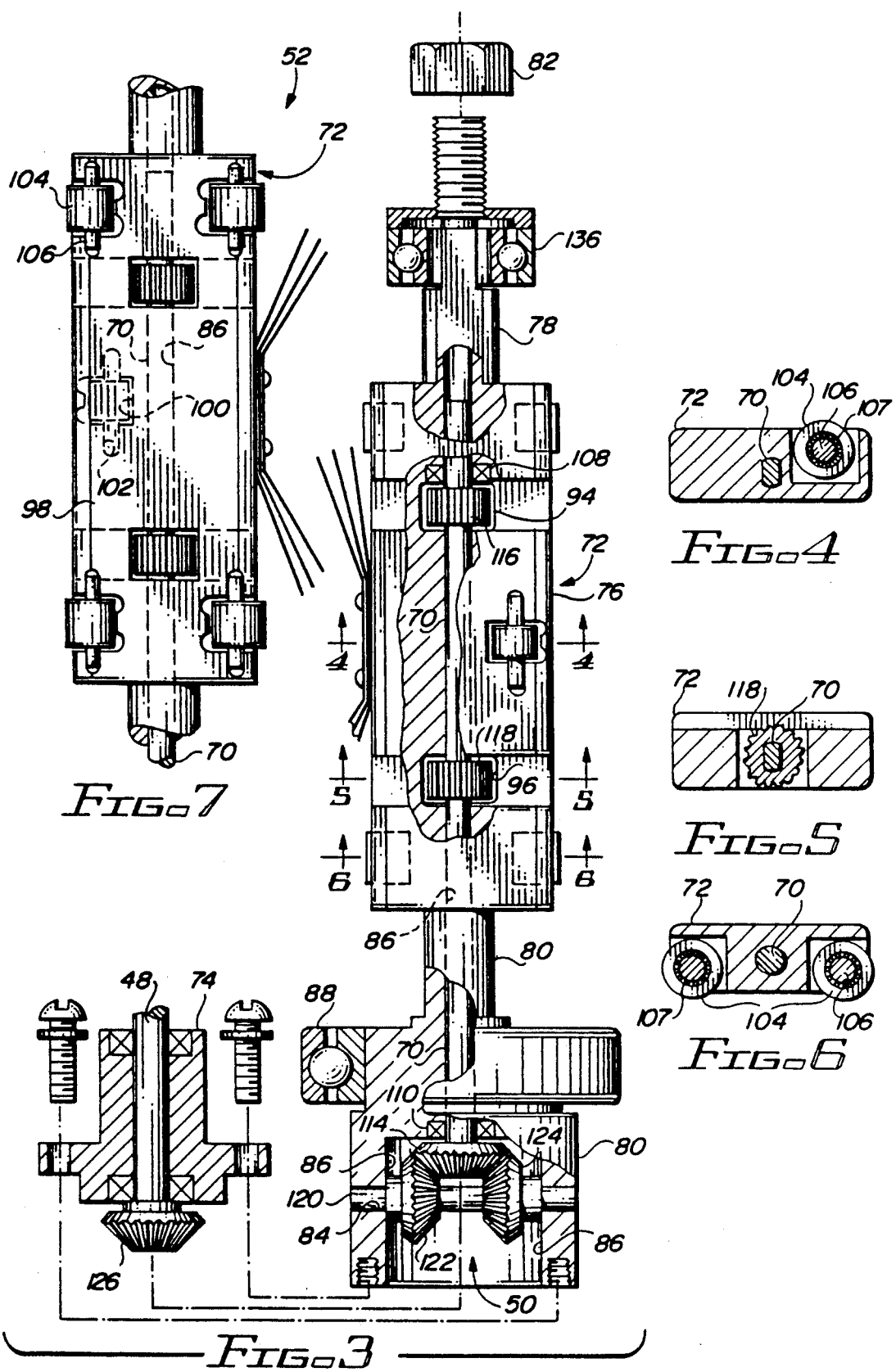

BUTTERFLY VALVE METHOD AND APPARATUS

Reference is made to the following copending and commonly-owned U.S. patent applications which disclose balanced-torque valves: Ser. No. 374,897, filed on Jun. 30, 1989; Ser. No. 395,234, filed on Aug. 17, 1989; Ser. No. 422,354, filed on Oct. 16, 1989; and Ser. No. 426,921, filed on Oct. 24, 1989.

TECHNICAL FIELD

This invention relates generally to butterfly valve methods and apparatus, and more specifically to those which employ or incorporate structure that permits translational movement of the valve plate relative to the pivot mechanism. Still more specifically, the invention relates to applications of such butterfly valves in which sealing engagement of the valve plate with the duct is required.

BACKGROUND OF THE INVENTION

In butterfly valves, translational movement of the valve plate relative to the pivot mechanism can be used to effect dynamic torque balancing, and to facilitate actuation by using the torque exerted by fluid on the plate to rotate the latter. To applicant's knowledge, these principles were first set forth in the above-referenced patent application, Ser. No. 374,897, filed on Jun. 30, 1989. They are schematically illustrated in FIGS. 12A-12C of the present application wherein numerals 20, 22, 24, 26, and 28 indicate a valve plate, a pivot shaft, a duct, a bracket intersecuring the shaft and plate, and the direction of flow respectively. Arrow 30 and numeral 32 indicate the center of pressure associated with the forces exerted by fluid on the plate 20, and the pivot line about which the plate is rotatable.

In FIG. 12A, the shaft 22 is centered in relation to the longitudinal dimension of the plate 20 and the plate is in a closed position. The center of pressure 30 is aligned with the pivot line 32, so the net torque exerted by the fluid on the plate 20 is zero. If the plate 20 is rotated to an open position as illustrated in FIG. 12B, and translated relative to the shaft 22 so that the center of pressure 30 is aligned with the pivot line 32 as illustrated in FIG. 12C, then the plate is effectively torque-balanced and the flow rate associated with the rotational angle 34 can be maintained with minimal input force required from the actuator 36. If the translational movement is too limited in range to achieve torque balancing at all rotational positions of the plate 20, it can still be used to advantage in minimizing the net torque exerted by the fluid, thus still minimizing the input force required from the actuator 36.

If it is desired to change the rotational angle 34, then the plate 20 can be translated relative to the shaft 22 in the appropriate direction to effect a misalignment of the center of pressure 30 with the pivot line 32, thus increasing the net fluid dynamic torque, and the force required to effect the change is exerted in whole or in part by the fluid conveyed in the duct 24.

Butterfly valves that are designed to provide for translational movement of the plate 20 relative to the shaft 22, for either or both of the above-described purposes, are referred to herein as "balanced-torque" butterfly valves.

Upon reflection, it will be understood that the use of balanced-torque butterfly valves in applications which demand a rotational angle 34 corresponding to a closed position presents the problem of providing for translational movement while also providing for initial opening of the valve plate 20. The problem may be particularly pronounced when the application requires sealing engagement of the valve plate 20 with the inner surface of the duct 24 at the closed position. If a rim seal is employed, the frictional force between the seal and the duct increases the torque required to rotate the valve plate away from the closed position. The problem is further exacerbated if the upstream fluid pressure is considerably high. In that case, the fluid may exert radially outward pressure on the rim seal and further increase the torque required to open the valve. A key advantage associated with balanced-torque butterfly valves is that smaller actuators can be used to control the rotational position of the valve plate. However, if a single actuator is used for both initial opening and subsequent movement of the valve plate, then the forementioned advantage is unrealized to the degree that power requirements from the actuator are dictated by the torque required for initial opening.

SUMMARY OF THE INVENTION

The invention pertains to applications of balanced-torque butterfly valves in which sealing engagement of the valve plate with the inner surface of the duct is required. In such applications, and in particular where the valve plate at a closed position separates an upstream region of considerably high pressure from a downstream region of relatively low pressure, the torque required to initially open the valve is heightened by the effect of high-pressure fluid on the peripherally disposed seal of the valve plate. The high-pressure fluid exerts pressure on the seal in a peripherally outward direction, putting the seal in aggressive contact with the inner surface of the duct.

The invention is directed to a method for opening such valves and to apparatus adapted for use with the method. In accordance with the invention, a slight translational movement of the valve plate is effected at the closed position prior to rotating the valve plate to open the valve. The valve is structurally adapted to provide a seal-venting function in response to the slight translational movement whereby the forementioned effect of the high-pressure fluid on the seal is relieved, thus lowering the torque required to open the valve.

BRIEF DESCRIPTION OF THE DRAWINGS

FIG. 3 is a partially elevational, partially cross-sectional, and partially exploded view of various components illustrated in FIG. 2, including a pivot mechanism and a differential gear.

FIGS. 4-6 are cross-sectional views taken along the lines indicated in FIG. 3.

FIG. 7 is an elevational and truncated view of the pivot mechanism.

DESCRIPTION OF THE PREFERRED EMBODIMENT

Figure 1:
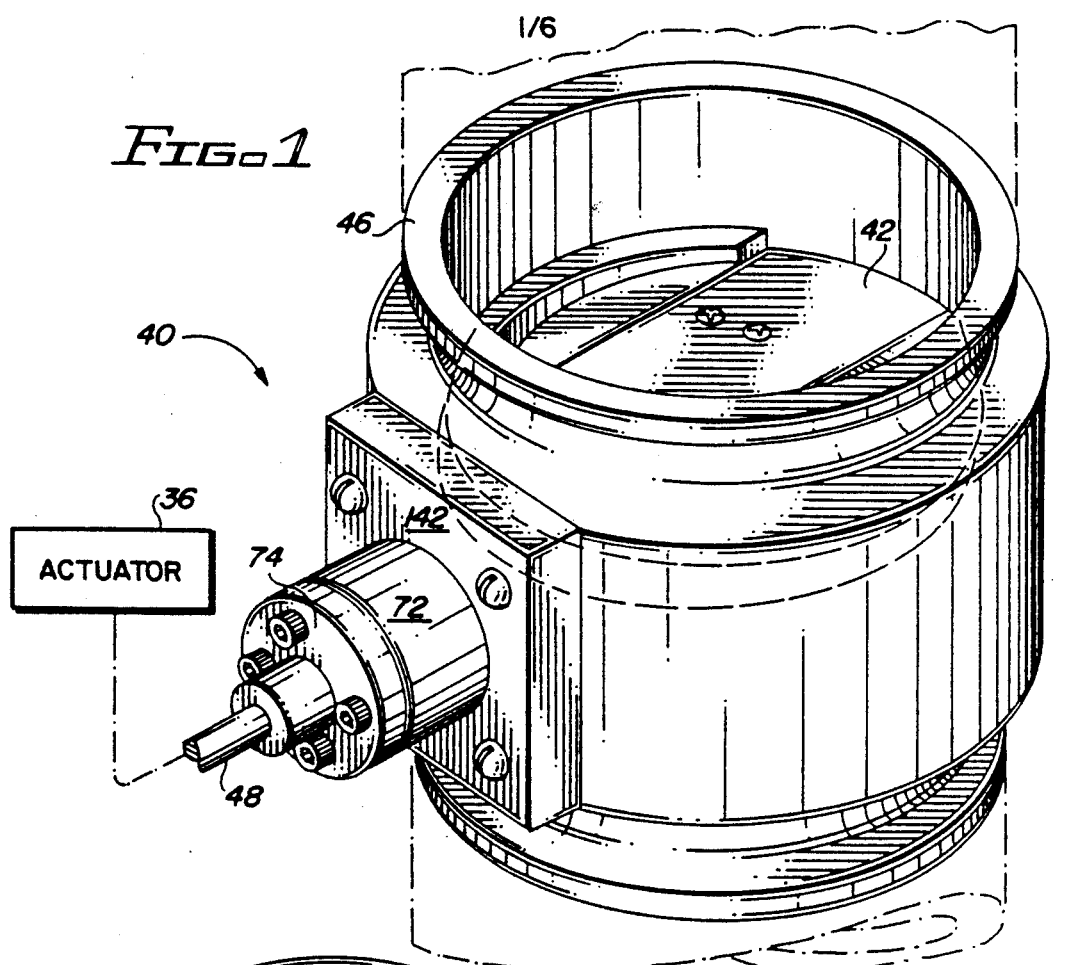
FIG. 1 is a perspective view of an assembled butterfly valve. Actuation of the valve is diagrammatically represented.

FIG. 1 of the accompanying drawings illustrates a butterfly valve 40 which is operable via an external actuator 36 to control the position of a valve plate 42. The valve plate 42 is pivotally disposed in and transects a flow path 44 (FIG. 10) defined by a mounting body 46.

In use, duct members (not shown) are secured to the mounting body 46 to define an elongate flow path along which a fluid is conveyed from a source thereof, through the valve 40, and to one or more points of use. Fluid flow is controlled by rotationally positioning the valve plate 42. The positioning is achieved in response to torque applied by the actuator 36 to an input shaft 48. This torque is transmitted through a differential gear 50 (FIG. 3, hereinafter "differential") to a pivot mechanism 52 (FIG. 7) which pivotally supports the valve plate 42 and is journalled in the mounting body 46.

Figure 8:
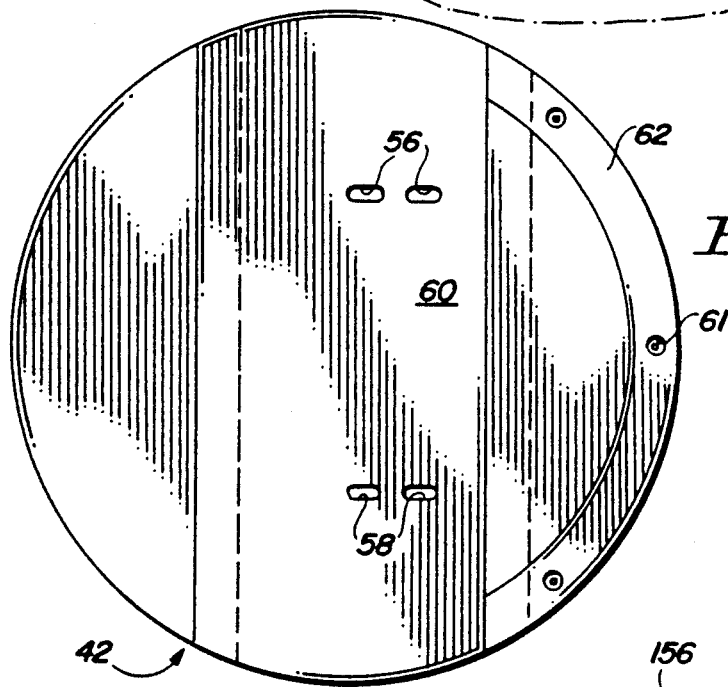
FIG. 8 is a top elevation of the valve plate illustrated in FIGS. 1 and 2.
Figure 9:
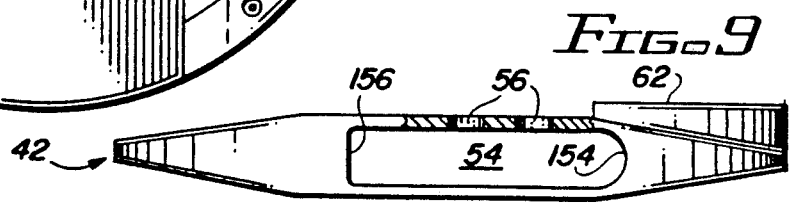
FIG. 9 is a side elevation, in partial cross-section, of the valve plate illustrated in FIG. 8.

FIGS. 8 and 9 illustrate the valve plate 42 in more detail. The diameter of the circular valve plate 42 is slightly less than the inside diameter of the mounting body 46 in order to accommodate translational movement of the plate in the flow path 44. Translational movement of the valve plate 42 relative to the pivot mechanism 52 (FIG. 7) is accommodated by a suitably dimensioned cavity 54 extending through the plate as indicated. Slots 56, 58 are formed between the downstream-facing surface 60 of the plate and the cavity 54. Small tapped bores (not shown) extending into the plate receive screws 61 that secure an arcuate fence 62 to the plate near the leading edge of the latter. The slots 56, 58 are provided for securement of a pair of rack gears 64, 66 (FIG. 2) to the plate 42.

Figure 2:
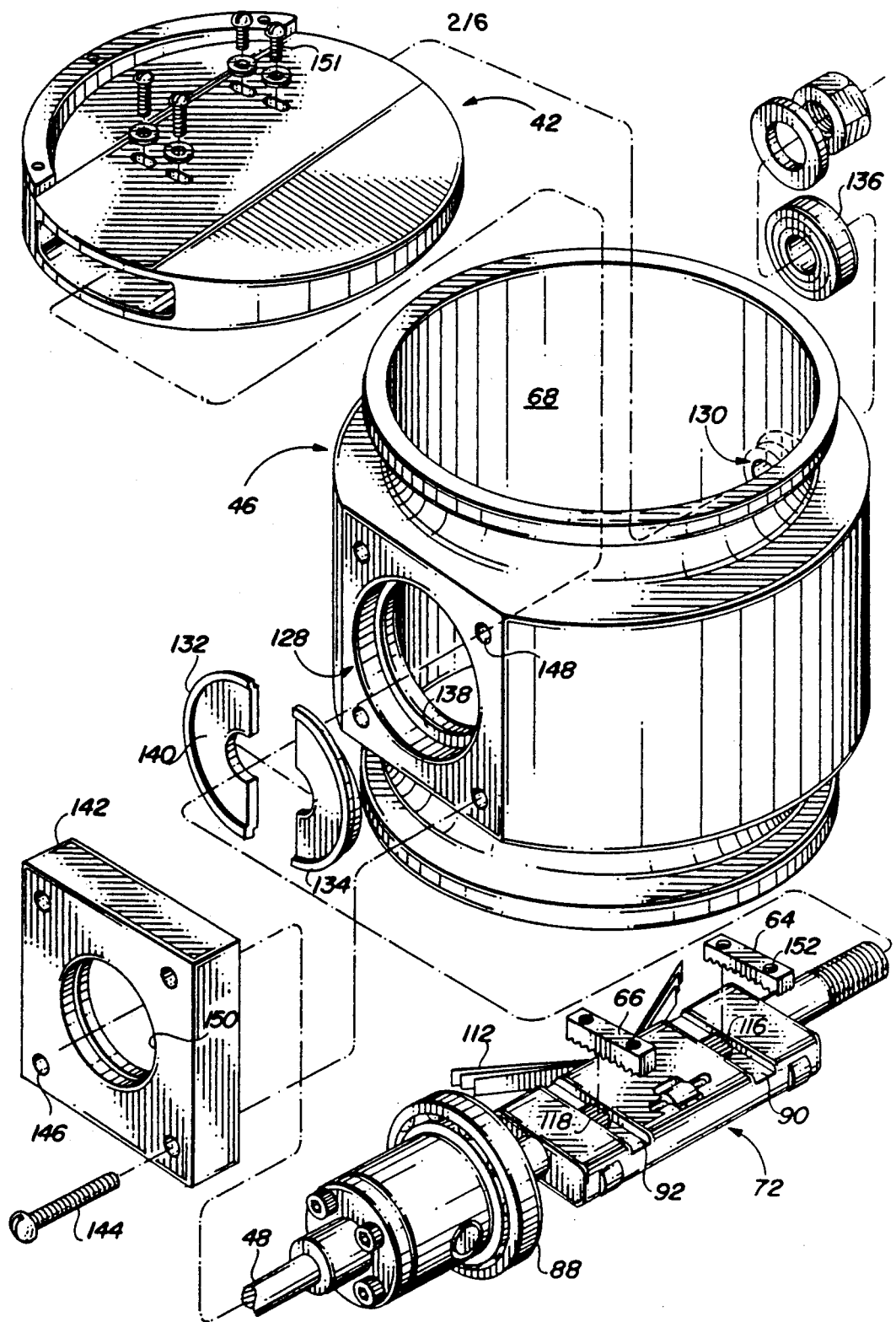
FIG. 2 is an exploded perspective view of the butterfly valve illustrated in FIG. 1.

FIGS. 2, 3, and 7 illustrate the pivot mechanism 52 and differential 50 in detail. The pivot mechanism 52 comprises a center shaft 70 and a carrier shaft 72 (hereinafter, "carrier"). The carrier 72 has a centrally-disposed oblong portion 76 and two cylindrical end portions 78, 80. One end portion 78 is threaded for engagement with a nut 82, and the other end portion 80 has a transversely-extending bore 84 formed therethrough. A longitudinally-extending stepped bore 86 is formed in the carrier 72 to accommodate receipt of the center shaft 70 and to provide a housing for the differential 50. The bore 86 is sufficiently large in diameter to permit rotation of the center shaft 70 therein. Transverse slots 90, 92 are milled in the central portion 76, and through-slots 94, 96 are formed from the transverse slots to the upstream-facing surface 98 of the carrier. The through-slots 94, 96 intersect the longitudinally extending bore 86 as indicated. Five deep recesses (as at 100) and associated cross-slots (as at 102) are milled in the carrier 72 for installation of five rollers (as at 104). Each roller 104 is rotatably secured to a small shaft (as at 106) via needle bearings 107 (FIG. 6). The shaft 106 is force-fitted in the cross-slot 102. The rollers 104 function as bearings to minimize friction between the carrier 72 and the valve plate 42 during translational movement 109 (FIG. 10) of the latter. The longitudinally extending bore 86 is enlarged at two locations and bearings 108, 110 are inserted. A bearing 88 is also pressed onto the cylindrical portion 80 as shown. A leaf spring 112 is rigidly secured to the edge of the carrier 72 via screws extending into tapped bores. (Note: Although the illustrated prototype incorporates the leaf spring 112, it is believed that a more robust biasing mechanism is preferable for most applications. Accordingly, the leaf spring 112 can be replaced by two suitably mounted and positioned coil springs, or such other functionally equivalent biasing means as are required in a given application).

A first bevel gear 114 of the differential 50 is pressed onto the center shaft 70 near the indicated end which extends into the differential housing. The center shaft 70 is received in the longitudinally-extending bore 86 and extends through the bearings 108, 110, and through two pinion gears 116, 118 positioned in the through-slots 94, 96 as illustrated.

A cross-shaft 120 is pressed through the cross-bore 84 and through needle bearings (not shown) received in the axial bores (not shown) of second and third bevel gears 122, 124. The fourth bevel gear 126 of the differential 50 is pressed onto the input shaft 48. The input shaft 48 extends through a stepped axial bore in an end cap 74 and is pressed through bearings seated in the latter. The end cap 74 is then secured to the end of the carrier 72 as indicated, with the fourth bevel gear 126 engaging the second and third 122, 124, and the latter two engaging the first 114 to form the differential 50.

It will be understood that the first and fourth bevel gears 114, 126 are rigidly secured to the center shaft 70 and input shaft 48, respectively, whereas the second and third bevel gears 122, 124 are rotatably secured to the cross-shaft 120. When rotational torque is applied to the input shaft 48, it is transmitted through the differential 50 to the center shaft 70. If the center shaft 70 is free to rotate, then it will do so in response to rotation of the input shaft 48. However, if the center shaft 70 is constrained from rotating, then the torque is transmitted to the carrier 72 via the cross-shaft 120.

The rack gears 64, 66 are positioned in the transverse slots 90, 92 and in engagement with the pinion gears 116, 118. The valve plate 42 is held inside the mounting body 46 and the leaf spring 112 is depressed as the pivot mechanism 52 is extended through an access port 128 and the cavity 54 (FIG. 9) until the threaded end portion 78 projects through on opposite port 130 formed through the mounting body.

Two semi-annular baffles 132, 134 are positioned around the carrier 72 between the bearing 88 and the central portion 76, and against an annular rim or boss 138 of the mounting body 46. The inside-facing surfaces (those not visible in FIG. 2) of the baffles 132, 134 are contoured to conform with the inner surface 68 of the mounting body 46, and the surfaces are flush when the baffles are positioned as described.

The pivot mechanism 52 is further extended through the cavity 54 until the bearing 88 abuts an annular land 140 defined by the baffles 132, 134. A cover plate 142 abuts the opposite side of the bearing 88 and is secured to the mounting body 46 via screws (as at 144) extending through bores (as at 146) and into tapped bores (as at 148). The cover plate 142 circumferentially surrounds the end portion 80 and the latter, along with the input shaft 48, projects through a central bore 150 in the cover plate.

The rack gears 64, 66 are rigidly secured to the valve plate 42 via screws (as at 151) extending through the slots 56, 58 (FIG. 8) and into tapped bores (as at 152) formed in the rack gears. A bearing 136 is pressed into the port 130 between the cylindrical portion 78 and the mounting body 46, and the pivot mechanism 52 is finally secured by tightly engaging the nut 82 with the threaded end portion 78.

When the valve 40 is assembled, the center shaft 70 is centered in relation to the valve plate 42 so that, in use, the net fluid dynamic torque is substantially zero when the plate is in the closed position. The leaf spring 112 is preloaded and abuts one transversely-extending, inside surface 154 (FIG. 9) of the valve plate 42, while the rollers 104 on the other end of the carrier 72 abut the opposite transversely-extending, inside surface 156.

Figure 10:
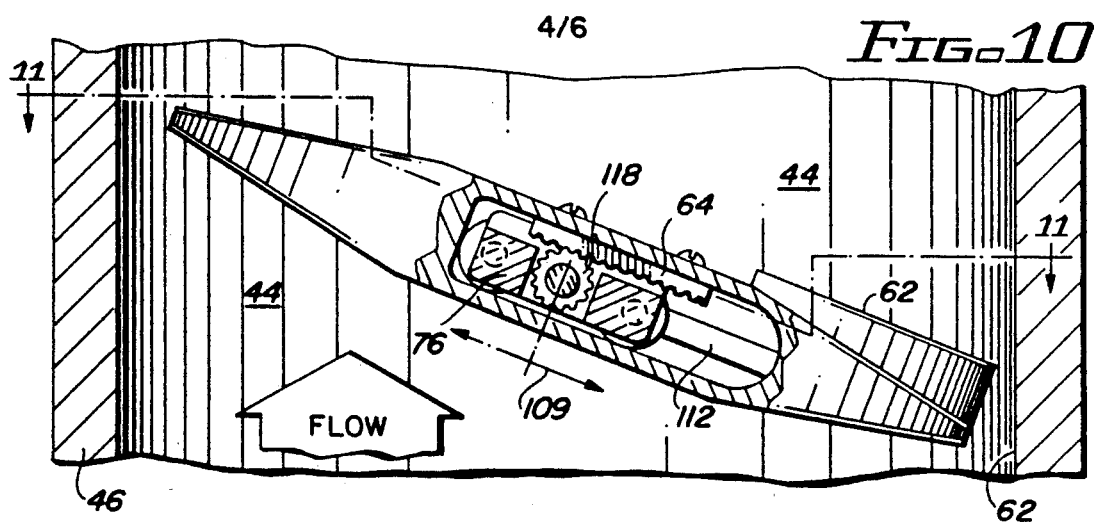
FIG. 10 is a partial, cross-sectional and partially elevational view of the butterfly valve, as viewed in a direction parallel to both the valve plate and the pivot mechanism.
Figure 11:
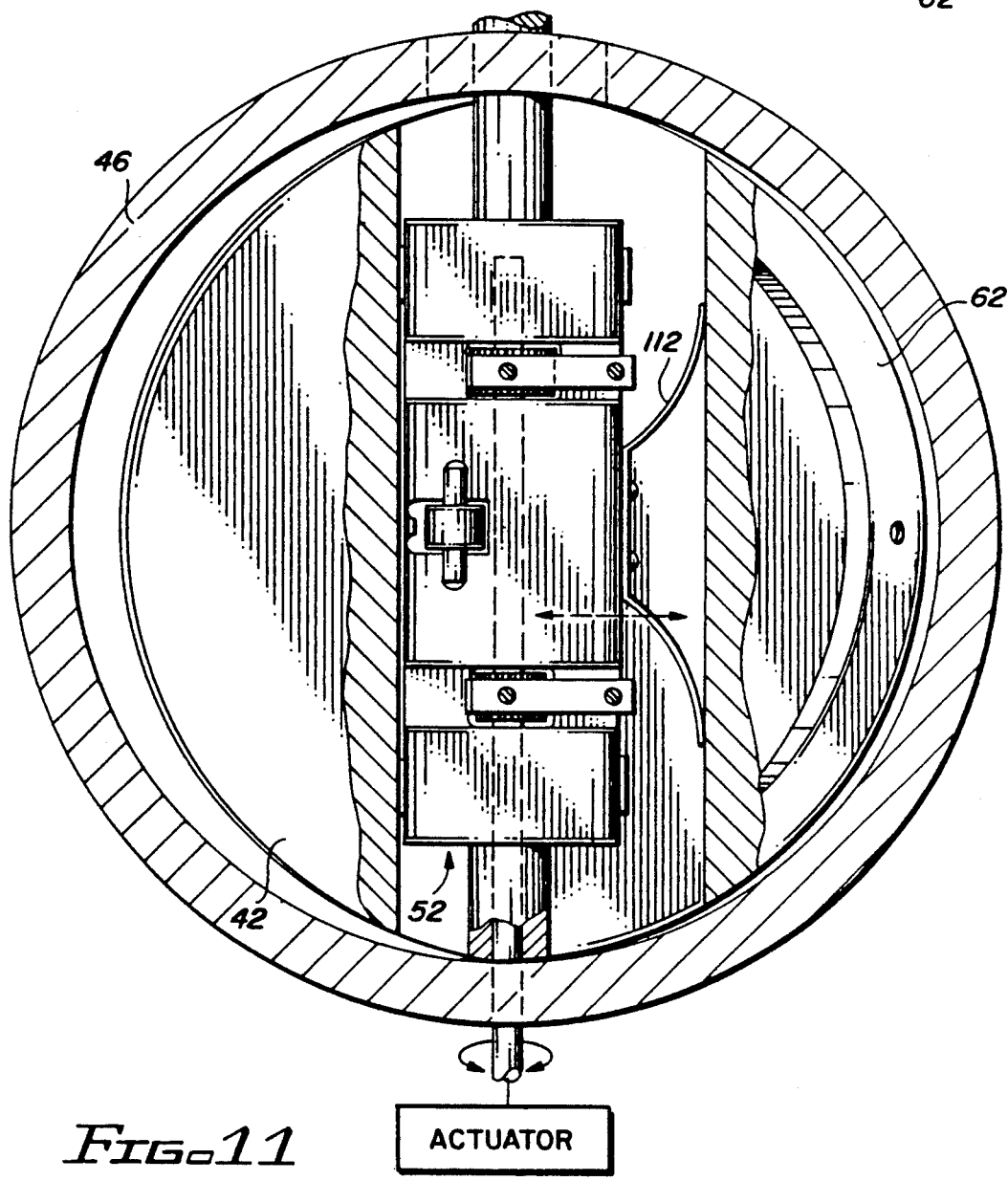
FIG. 11 is an elevational and partially fragmented view taken along lines 11—11 of FIG. 10.

At all times, the rollers 104 collectively abut both oppositely-facing and longitudinally-extending inside surfaces (not referenced by numerals, these are the surfaces which are generally parallel to the valve plate as viewed in FIGS. 9 and 10) of the valve plate 42. Accordingly, the carrier 52 and rollers 104 cooperate to bear the pressure exerted by fluid on the valve plate so that load-bearing by the rack and pinion gears 64, 66, 116, 118 is limited to that asociated with power transmission.

When the input shaft 48 is rotated, the rotational torque is transferred to the center shaft 70 and the normal response, in the absence of the leaf spring 112, is rotation of the center shaft 70. Rotation of the center shaft 70 is accompanied by translational movement 109 of the valve plate 42 relative to the carrier 72 via coaction of the rack and pinion gears 64, 66, 116, 118. If the translational movement is impeded sufficiently to prevent rotation of the center shaft 70, then the response to rotation of the input shaft 48 is rotation of the carrier 72 and, consequently, rotation of the valve plate 42. Since the oblong portion 76 of the carrier 72 is generally conformal with the cavity 54 (allowing, however, for translational movement and the provision of rollers 104), the valve plate 42 and carrier coact to rotate together when either is rotated; and since the cylindrical end portion 80 of the carrier extends outwardly from the flow path 44 and through the mounting body 46, the rotational position of the valve plate is easily ascertainable from the exterior of the mounting body by reference to the rotational position of the carrier.

Impedance of translational movement can occur without use of the leaf spring 112 when the valve plate 42 is in the closed position, since the plate is then forced edgewise against the inside surface 68 of the mounting body 46. However, such an arrangement requires considerably higher initial opening torque since the impedance is accompanied by frictional forces between the mounting body 46 and valve plate 42. Accordingly, a biasing mechanism is employed so that rotational movement is the normal response when the valve plate 42 is moved away from the closed position after seal venting, as is described hereinafter. In open rotational positions, the valve plate 42 moves rotationally in response to rotation of the input shaft 48 so long as impedance to rotational movement—the impedance resulting from net fluid dynamic torque—is insufficient to overcome the impedance to translational movement that results from the spring force. When the impedance to rotational movement is sufficiently high, (i.e. when the center of pressure 30 is sufficiently misaligned with the pivot line 32 as illustrated in FIGS. 12, the pivot line of the preferred embodiment being the longitudinal axis of the carrier 72), then the valve plate 42 moves translationally to decrease the net torque until the impedance is again insufficient to overcome that resulting from the spring force.

Figure 13:
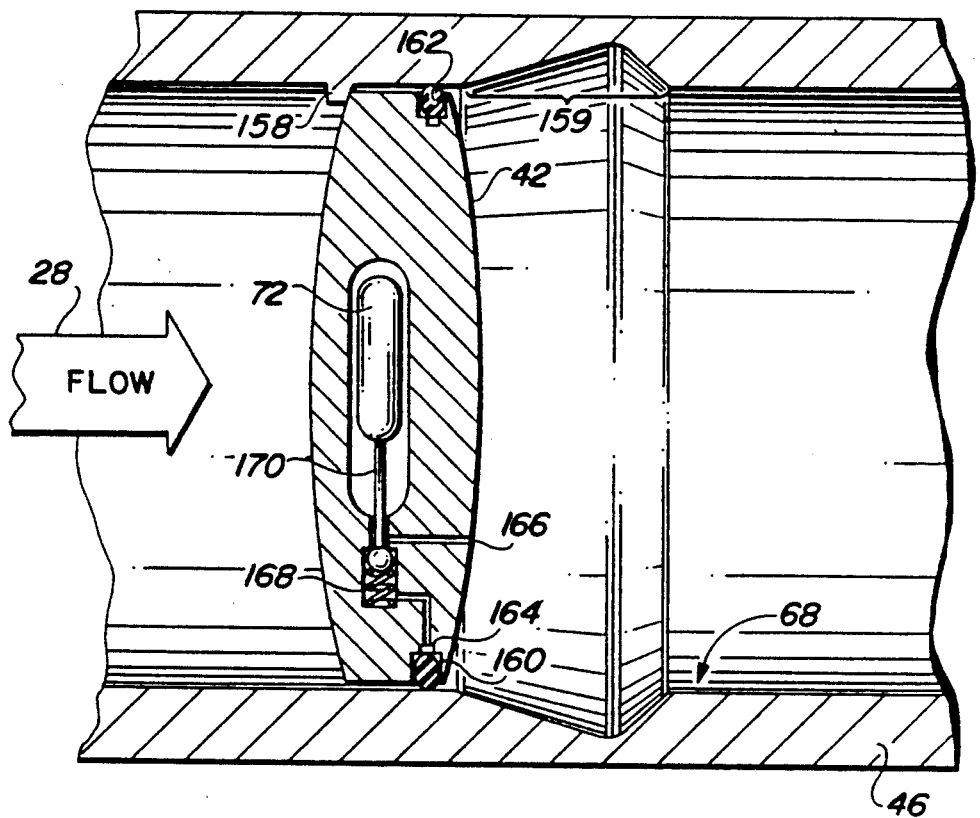
FIG. 13 is a schematic illustration of a balanced-torque butterfly valve incorporating the invention.

This invention is directed to applications of balanced-torque butterfly valves which require sealing at the closed rotational position of the valve plate 42. FIG. 13 schematically illustrates the preferred embodiment of the invention as currently contemplated. As illustrated, fluid communication is sealingly closed with the valve plate 42 at a rotational angle of approximately zero. The mounting body 46 is adapted to provide a suitable stop 158 in order to prevent undesired rotational movement of the valve plate 42. To accommodate translational movement, the inside surface 68 of the mounting body 46 is radially extended over a range 159 immediately downstream from an annular recess 160 formed in the circumferential edge of the valve plate 42. The recess 160 is offset from the carrier 72 to provide circumferentially continuous sealing. A seal 162 is seated in the recess 160 and abuts the inside surface 68. As is suggested above, a potential difficulty in butterfly valves which employ rim seals in high-pressure-ratio applications is that the high-pressure fluid on the upstream side of the valve plate 42 gets between the recess 160 and the seal 162. The fluid exerts radially outward force on the seal 162, which puts the seal in more aggressive contact with the inside surface 68. While that effect may be desirable for sealing purposes, it has the undesirable consequence of increasing the torque required to initially open the valve. Accordingly, in the FIG. 13 arrangement the valve plate 42 is adapted to provide one-way fluid communication from the recess 160 to the downstream side of the plate in order to relieve the forementioned outward pressure exerted on the seal 162. This is accomplished by forming an inner annulus 164 which fluidically connects the recess 160 to a flow passage 166. The passage 166 extends from the annulus 164 to the downstream side of the valve plate 42, and is blocked by a check valve 168. A push rod 170 is rigidly secured to the carrier 72 and is in contact with the check valve 168 so that a very slight translational movement of the valve plate 42 results in opening the check valve. In the closed position illustrated, the seal 162 impedes rotational movement of the valve plate 42 to a greater degree than the spring 112 (FIG. 2) impedes translational movement. Accordingly, when the valve plate 42 is sealingly closed as shown, rotation of the input shaft 48 (FIG. 2) results in rotation of the center shaft 70, and the valve plate is translated very slightly relative to the carrier 72. This slight translational movement opens the check valve 168, thus relieving the radially outward pressure exerted on the seal 162 and decreasing impedance to rotational movement of the valve plate 42. Use of the check valve 168 for both biasing (i.e. as an equivalent to the leaf spring 112 of FIG. 2) and seal-venting purposes is a possibility that has not been fully explored.

It should be understood that although a circular valve plate 42 is illustrated, the invention is equally applicable in a rectangular valve plate/rectangular duct arrangement, and that the term "butterfly valve" as used herein is intended to include such structures.

Figure 12A:
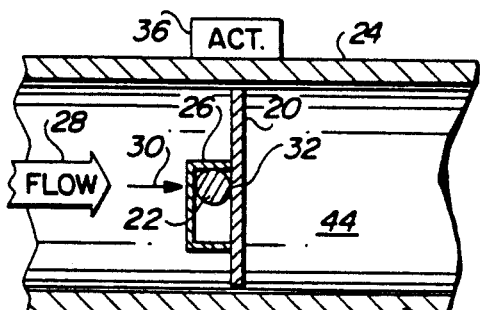
FIGS. 12A–12H are schematic illustrations of a balanced-torque butterfly valve showing various rotational and translational positions of the valve plate. These are provided to illustrate the principles and use of a butterfly valve as disclosed herein.
Figure 12B:
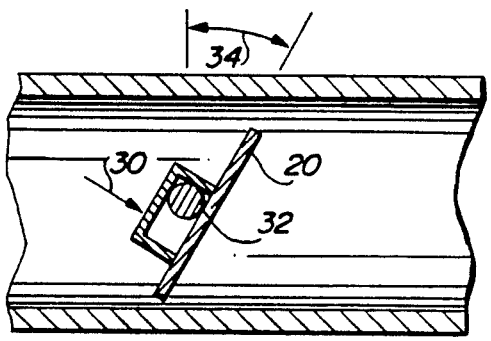
Figure 12C:
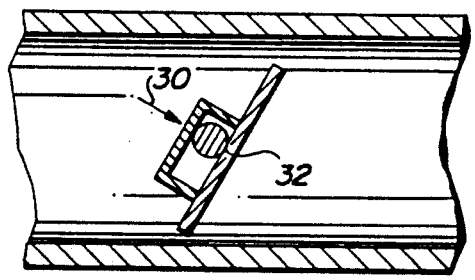
Figure 12D:
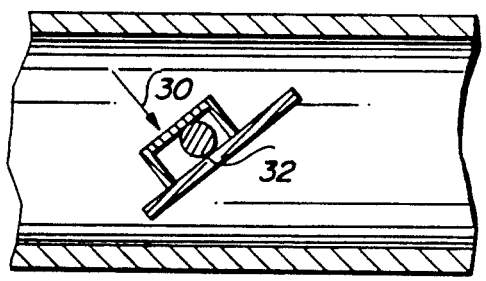
Figure 12E:
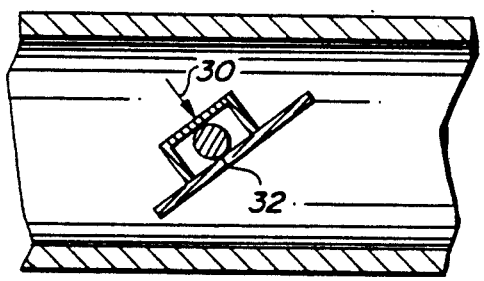
Figure 12F:
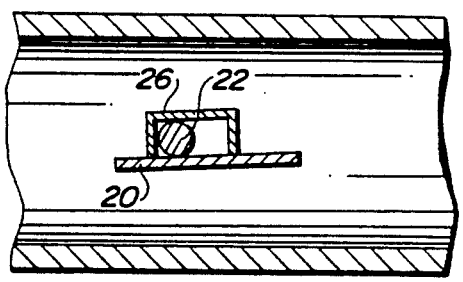

Use of the invention will now be described by reference to FIGS. 12A–12F. The valve plate 20, which is initially at a sealingly closed position (FIG. 12A), is slightly translated to effect the above-described seal venting function. The valve plate 20 is then rotationally moved away from the closed position toward a second rotational position (FIG. 12F) permitting maximum fluid communication. The valve plate 20 is subjected to a net torque exerted by the fluid conveyed along the path 44 and the net torque increases with the rotational movement as the center of pressure 30 moves below the pivot line 32, this being illustrated in FIG. 12B. The valve plate 20 is translationally moved relative to the pivot shaft 22 so that the center of pressure 30 is more closely aligned with the pivot line 32, thus decreasing the net torque, as illustrated in FIG. 12C. Continued rotational movement toward the second position (FIG. 12F), facilitated by the translational movement, is effected with a concomitant increase in the net torque as the center of pressure 30 again moves relative to the pivot line 32, this being illustrated in FIG. 12D. Continued translational movement again more closely aligns the center of pressure 30 with the pivot line 32 so that further rotational movement toward the second position (FIG. 12F) is facilitated, as indicated in FIG. 12E.

Rotational movement of the valve plate 20 continues until the plate reaches a desired rotational position (as in FIG. 12E) associated with a desired flow rate. The translational movement facilitates the rotational movement and, since the net torque exerted by the fluid on the plate is minimized via the translational movement, minimizes the load on the actuator 36 at the desired rotational position.

The overall movement of the valve plate is characterized by both rotational and translational components, although it may be substantially continuous between one rotational position and another. Thus, the progression indicated by FIGS. 12A-12E exaggerates the discreteness of successive translational or rotational components of movement, to the end of providing an easily understood illustration of the overall movement.

Figure 12G:
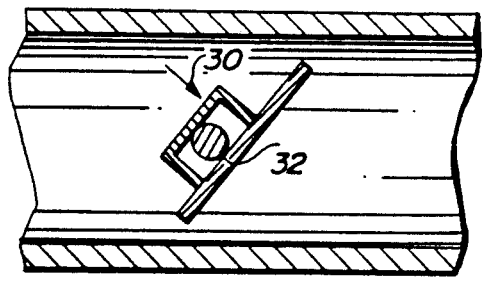
Figure 12H:
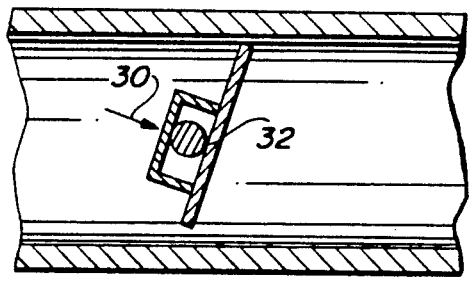

FIGS. 12G and 12H illustrate the movement in reverse. That is, starting from a rotational position such as that illustrated in FIG. 12E where the valve plate 20 is substantially torque-balanced, the plate is rotationally moved toward the closed position (FIG. 12A), thus effecting a greater degree of misalignment between the center of pressure 30 and the pivot line 32, as illustrated in FIG. 12G. The valve plate 20 is also translationally moved as illustrated in FIG. 12H to effect a lesser degree of misalignment, thus facilitating further rotational movement toward the closed position.

The reader should understand that the foregoing portion of the description, which description includes the accompanying drawings, is not intended to restrict the scope of the invention to the preferred embodiment thereof or to specific details which are ancillary to the teaching contained herein. The invention should be construed in the broadest manner which is consistent with the following claims and their equivalents.

What is claimed is:

1. In a balanced-torque butterfly valve having a valve plate which is pivotally disposed in an elongate flow path defined by a duct, wherein the valve plate is pivotal from a first rotational position closing fluid communication along the path to a second rotational position maximally permitting fluid communication along the path, wherein the valve plate at the first rotational position separates a high-pressure, upstream region of the flow path from a lower-pressure, downstream region of the flow path, wherein the valve plate comprises a peripherally-disposed seal which cooperates with the duct to close fluid communication at the first rotational position, and wherein the seal at the first rotational position is subjected to peripherally outward pressure exerted thereon by pressurized fluid, a method for opening the valve comprising the steps of:

first, effecting a slight translational movement of the valve plate at the first position and in a direction substantially parallel to the plate, whereby the peripherally outward pressure exerted on the seal is decreased; and second, rotating the valve plate away from the first position and toward the second position to open the valve.

2. A method as recited in claim 1 wherein after performance of the second step the valve plate is subjected to a net fluid dynamic torque which resists further rotational movement toward the second position, and comprising the further step of translationally moving the valve plate in a direction substantially parallel thereto, whereby the net fluid dynamic torque is decreased.

3. A balanced-torque butterfly valve comprising a duct defining an elongate flow path; a rotatable shaft supported in the duct and extending across the flow path; a valve plate transecting the flow path and being pivotally supported therein by the shaft; the valve plate having a peripherally disposed seal and a recess in which the seal is seated, whereby the shaft, valve plate, and duct are cooperable to close fluid communication along the flow path; the valve plate having a flow passage formed therein to provide for fluid communication between the recess and a downstream-facing surface of the valve plate; a check valve disposed in the flow passage for alternately blocking or permitting fluid communication along the passage; and a push rod secured to the shaft and in contact with the check valve for opening the latter in response to translational movement of the valve plate relative to the shaft.

4. The invention of claim 3 wherein the valve plate is pivotal from a first rotational position closing fluid communication along the flow path to a second rotational position maximally permitting fluid communication along the path, and wherein the check valve is normally closed when the valve plate is at the first rotational position, but is opened in response to slight translational movement of the valve plate at the first position.

* * * * *